(12) United States Patent
Moyher, Jr. et al.

(10) Patent No.: US 12,070,012 B2
(45) Date of Patent: *Aug. 27, 2024

(54) PET BATHING TOOL AND SYSTEM

(71) Applicant: BISSELL Inc., Grand Rapids, MI (US)

(72) Inventors: George Moyher, Jr., Cedar Springs, MI (US); Eric J. Hansen, Grand Rapids, MI (US); Belinda Drake, Grand Rapids, MI (US); Sue A. Potter, Grand Rapids, MI (US); Charles A. Martin, Kalamazoo, MI (US); Brian C. Wolfe, Kalamazoo, MI (US); Joseph Q. Marietta, Kalamazoo, MI (US)

(73) Assignee: BISSELL Inc., Grand Rapids, MI (US)

( * ) Notice: Subject to any disclaimer, the term of this patent is extended or adjusted under 35 U.S.C. 154(b) by 164 days.

This patent is subject to a terminal disclaimer.

(21) Appl. No.: 17/370,604

(22) Filed: Jul. 8, 2021

(65) Prior Publication Data

US 2021/0329886 A1 Oct. 28, 2021

Related U.S. Application Data

(63) Continuation of application No. 15/793,426, filed on Oct. 25, 2017, now Pat. No. 11,083,170.

(Continued)

(51) Int. Cl.
*A01K 13/00* (2006.01)
*A47L 7/00* (2006.01)
(Continued)

(52) U.S. Cl.
CPC .......... *A01K 13/001* (2013.01); *A47L 7/0009* (2013.01); *A47L 9/06* (2013.01);
(Continued)

(58) Field of Classification Search
CPC ........ A47L 9/06; A47L 9/0606; A47L 9/0613; A47L 5/24; A47L 5/36; A47L 5/365;
(Continued)

(56) References Cited

U.S. PATENT DOCUMENTS 4,027,984 A * 6/1977 Underwood ......... A46B 11/066
 401/28
4,073,030 A * 2/1978 Albishausen ........... A47L 11/34
 15/322

(Continued)

FOREIGN PATENT DOCUMENTS

CN 1838907 A 9/2006
CN 201018824 Y 2/2008
(Continued)

OTHER PUBLICATIONS

Lucia Batres Arnal, European Search Report, Mar. 9, 2018, 8 pages, The Hague, Munich, Germany.

*Primary Examiner* — Makena S Markman
(74) *Attorney, Agent, or Firm* — Quinn IP Law

(57) ABSTRACT

A pet bathing system for use with a surface cleaning apparatus is provided and includes at least a wand override tool to allow for an easy-to-use pet bathing system. The system can be used for the bathing of pets via the application and subsequent extraction of liquid. The wand override tool includes a cleaning solution reservoir and couplers adapted to be coupled with a surface cleaning apparatus having a suction source and a cleaning fluid source and with a hand tool.

18 Claims, 11 Drawing Sheets

Related U.S. Application Data

(60) Provisional application No. 62/412,468, filed on Oct. 25, 2016.

(51) Int. Cl.
*A47L 9/02* (2006.01)
*A47L 9/06* (2006.01)
*A47L 11/34* (2006.01)
*A47L 11/40* (2006.01)

(52) U.S. Cl.
CPC ............... *A47L 9/0673* (2013.01); *A47L 9/02* (2013.01); *A47L 11/34* (2013.01); *A47L 11/4013* (2013.01); *A47L 11/4036* (2013.01); *A47L 11/4083* (2013.01)

(58) Field of Classification Search
CPC ...... A47L 5/362; A47L 7/0009; A47L 7/0066; A47L 11/34; A47L 11/4013; A47L 11/4083; A47L 11/4036; A47L 11/4044; A47L 9/0673; A01K 13/001; A01K 13/00; A01K 13/002; A46B 2200/1093; A46B 2200/104; A47B 17/06; A47B 11/06; A61D 7/00; A61D 11/00; B08B 2203/0247; B08B 2203/0217; B08B 2203/0229

See application file for complete search history.

(56) References Cited

U.S. PATENT DOCUMENTS

| | | | |
|---|---|---|---|
| 4,333,203 A | 6/1982 | Yonkers | |
| 4,408,366 A * | 10/1983 | Goldsmith | A47L 11/4044 15/322 |
| 4,517,703 A * | 5/1985 | Koke | A46D 1/0284 15/187 |
| 4,779,572 A | 10/1988 | Freulon | |
| 5,462,018 A * | 10/1995 | Louison | A01K 13/001 119/626 |
| 5,735,017 A * | 4/1998 | Barnes | A47L 11/4027 15/328 |
| 5,768,748 A | 6/1998 | Silvera et al. | |
| 5,823,145 A | 10/1998 | Hingiss | |
| 6,189,178 B1 * | 2/2001 | Roberts | A47L 11/4044 15/DIG. 1 |
| 6,244,273 B1 | 6/2001 | Higgins | |
| 6,453,848 B1 | 9/2002 | Hachey | |
| 6,898,820 B2 | 5/2005 | McDowell | |
| 7,073,226 B1 | 7/2006 | Krebs | |
| 7,225,758 B1 | 6/2007 | Galloway | |
| 7,309,182 B2 * | 12/2007 | McKay | A46B 11/0017 401/129 |
| 7,484,265 B2 | 2/2009 | Vander Baan | |
| 7,578,025 B2 | 8/2009 | Kostreba et al. | |
| 7,870,638 B2 | 1/2011 | Jansen | |
| 7,987,819 B1 | 8/2011 | Bridges | |
| 8,006,647 B2 * | 8/2011 | Raber | A46B 11/063 119/664 |
| 8,082,887 B2 * | 12/2011 | Fernandez | A01K 13/002 119/664 |
| 8,205,296 B1 | 6/2012 | Bissell et al. | |
| 8,555,463 B1 | 10/2013 | Laube | |
| 8,991,000 B2 | 3/2015 | Perry | |
| 9,615,703 B2 | 4/2017 | Moyher, Jr. et al. | |
| 11,083,170 B2 * | 8/2021 | Moyher, Jr. | A47L 11/4044 |
| 2002/0016512 A1 | 11/2002 | Corbett | |
| 2004/0173163 A1 | 9/2004 | Bond | |
| 2006/0124075 A1 | 6/2006 | Matsumoto | |
| 2006/0272120 A1 | 12/2006 | Barrick et al. | |
| 2007/0068545 A1 | 3/2007 | Dallianis et al. | |
| 2009/0173163 A1 | 7/2009 | Workman | |
| 2010/0122663 A1 | 5/2010 | Fernandez | |
| 2011/0132406 A1 * | 6/2011 | Huffman | A01K 13/001 134/21 |
| 2014/0201940 A1 | 7/2014 | Moyher, Jr. | |
| 2017/0049076 A1 | 2/2017 | Takla | |
| 2017/0055794 A1 | 3/2017 | Labarbera et al. | |
| 2017/0127900 A1 | 5/2017 | Wright et al. | |

FOREIGN PATENT DOCUMENTS

| | | |
|---|---|---|
| CN | 101257794 A | 9/2008 |
| CN | 101889556 A | 11/2010 |
| CN | 201640166 U | 11/2010 |
| CN | 201700240 U | 1/2011 |
| CN | 102085082 A | 6/2011 |
| CN | 202425437 U | 9/2012 |
| CN | 103445729 A | 12/2013 |
| CN | 203467392 U | 3/2014 |
| CN | 203538627 U | 4/2014 |
| CN | 104287675 A | 1/2015 |
| CN | 204291973 U | 4/2015 |
| CN | 204317239 U | 5/2015 |
| CN | 104797131 A | 7/2015 |
| CN | 204762746 U | 11/2015 |
| CN | 205728615 U | 11/2016 |
| CN | 106901648 A | 6/2017 |
| CN | 206289576 U | 6/2017 |
| DE | 202004011639 U1 | 10/2004 |
| TW | 201637568 A | 11/2016 |
| WO | 2008128288 A1 | 10/2008 |

* cited by examiner

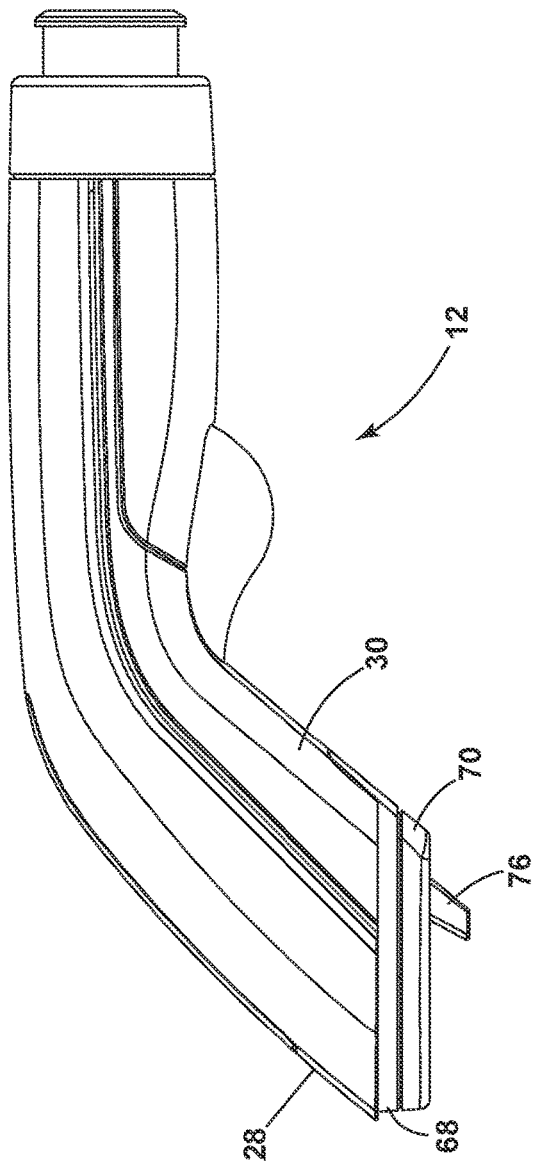
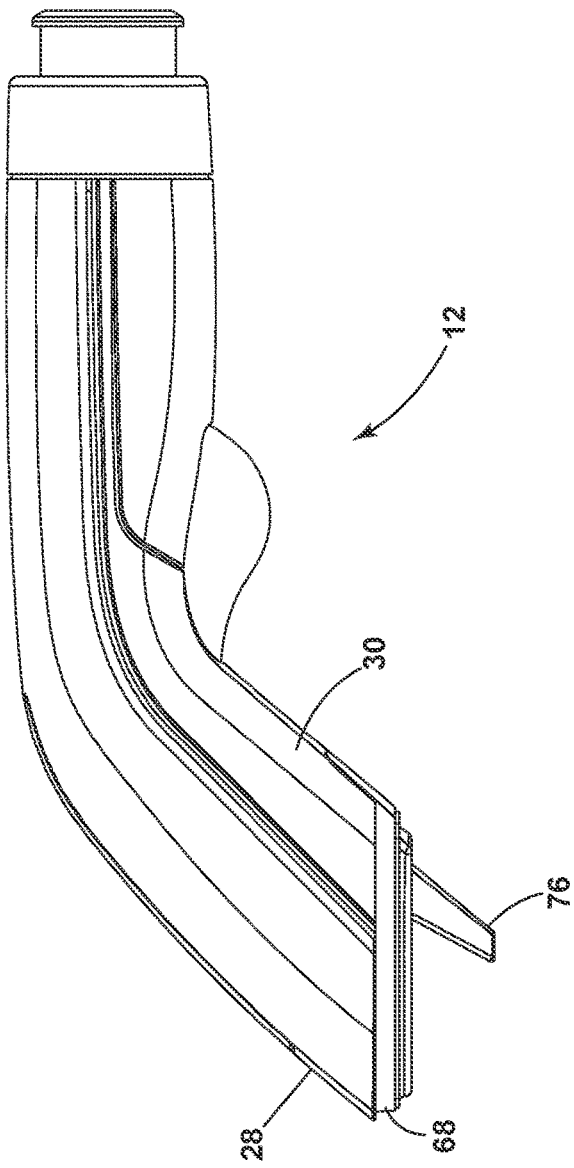
FIG. 5A
FIG. 5B

PET BATHING TOOL AND SYSTEM

CROSS-REFERENCE TO RELATED APPLICATIONS

This application is a continuation of U.S. patent application Ser. No. 15/793,426, filed Oct. 25, 2017, now allowed, which claims the benefit of U.S. Provisional Patent Application No. 62/412,468, filed on Oct. 25, 2016, both of which are incorporated herein by reference in its entirety.

BACKGROUND

A surface cleaning apparatus can be embodied as a portable or hand-carriable unit, an upright-type unit, a canister-type unit, or a stick-type unit. One exemplary surface cleaning apparatus can be adapted to be hand-carried by a user to a cleaning area. Such a surface cleaning apparatus can be provided with hoses and hand tools adapted for cleaning a variety of surfaces. Some hand tools are adapted in particular for grooming pets by vacuuming hair and other debris from the coat and skin of the pet.

BRIEF DESCRIPTION

In one aspect, the present disclosure relates to a hand tool for grooming a pet and adapted to be fluidly coupled with a surface cleaning apparatus having a suction source and a fluid delivery system, the hand tool including a body that is hand-holdable by a user and defines an interior and a lower surface, a suction nozzle provided with the body, at least one spray nozzle provided at least partially within the interior, and at least one grooming guard removably provided at the lower surface of the body, wherein the at least one grooming guard includes at least one aperture, and wherein the at least one spray nozzle projects through the at least one aperture.

In another aspect, the present disclosure relates to a system for bathing a pet including a surface cleaning apparatus having a suction source and a fluid delivery system, a hand tool adapted to be fluidly coupled with the surface cleaning apparatus, the hand tool comprising a body that is hand-holdable by a user and defines an interior and a lower surface, a suction nozzle provided with the body, the suction nozzle in fluid communication with the suction source, at least one spray nozzle provided at least partially disposed within the interior, and at least one grooming guard removably provided at the lower surface of the body, wherein the at least one grooming guard includes at least one aperture, and wherein the at least one spray nozzle projects through the at least one aperture.

BRIEF DESCRIPTION OF THE DRAWINGS

In the drawings:

FIGS. 5A and 5B are side views of a portion of the hand tool from FIG. 1.

DETAILED DESCRIPTION

The present disclosure relates to a tool for bathing pets. In one of its aspects, the present disclosure relates to a tool which can be used to wash pets via the application and subsequent extraction of liquid. In another aspect, the present disclosure relates to a tool which can be used to adapt a surface cleaning apparatus normally used for cleaning floors and upholstery to instead bathe a pet. While discussed in the context of bathing pets, it is noted that the tool may have other applications, including general use as an extraction cleaning accessory tool for a surface cleaning apparatus that is operable to apply liquid and extract liquid from any surface to be cleaned.

Figure 1:
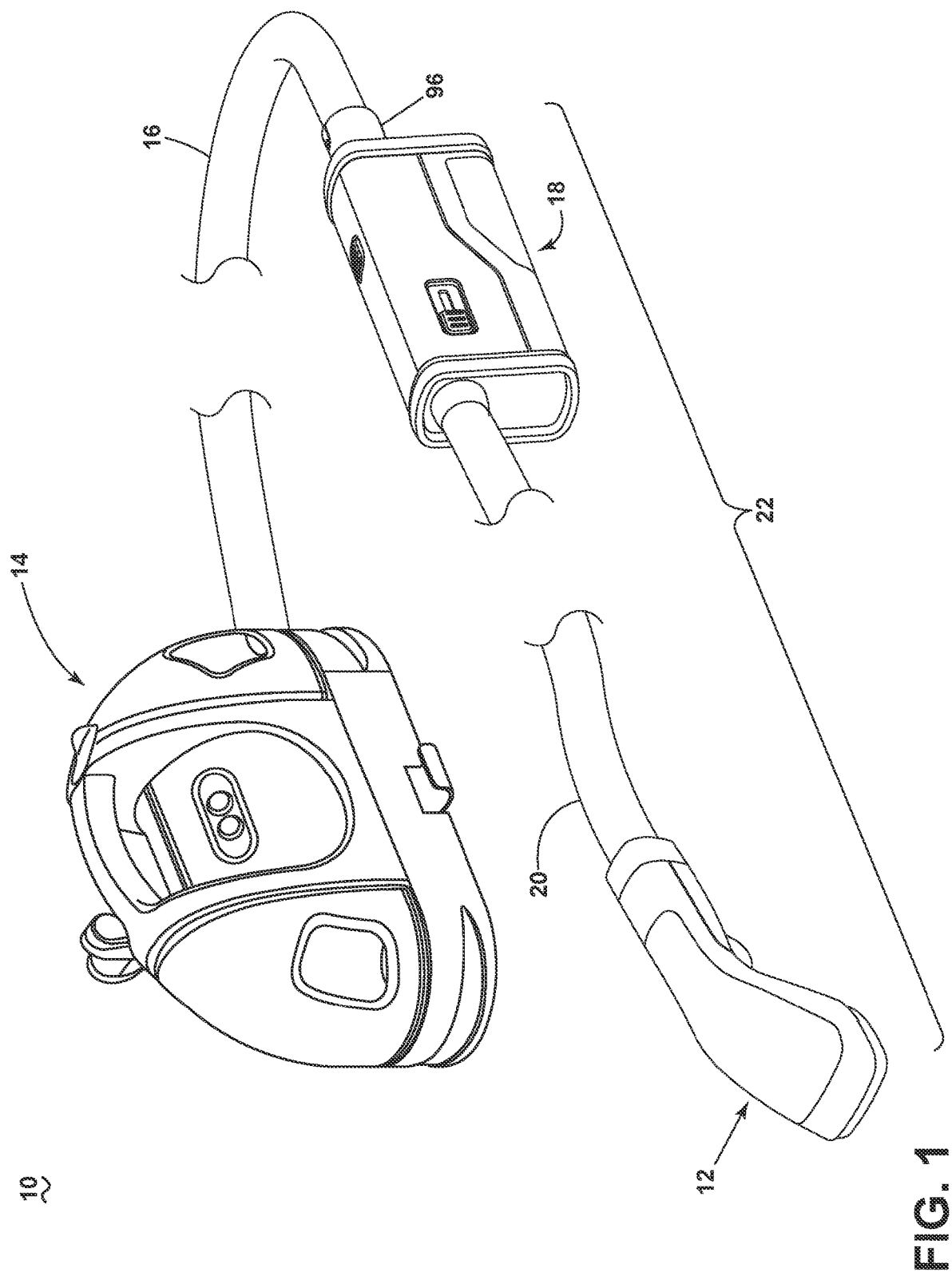
FIG. 1 is a front perspective view of a pet bathing system according to a first example of the present disclosure.

FIG. 1 shows a front perspective view of a system 10 for bathing a pet according to a first example of the present disclosure, which includes a pet bathing hand tool 12 coupled with a surface cleaning apparatus 14 via a conduit assembly, at least a portion of which may be in the form of a flexible hose 16, which can be an extension hose. The hose 16 can include both a suction conduit defining a portion of a recovery pathway of the system 10 and a fluid delivery conduit within the suction conduit defining a portion of a fluid delivery pathway of the system 10. A wand override tool, illustrated herein as a wand override unit 18 can additionally be coupled to the surface cleaning apparatus 14 via the hose 16, and further coupled to the pet bathing hand tool 12 via an extension hose 20, at least a portion of which may be in the form of a flexible hose. The extension hose 20 can include both a suction conduit 23 (FIG. 6) defining a portion of the recovery pathway and a fluid delivery conduit 21 within the suction conduit 23 defining a portion of the fluid delivery pathway. For purposes of description related to the hand tool 12 shown in the figures, the terms "upper," "lower," "right," "left," "rear," "front," "vertical," "horizontal," and derivatives thereof shall relate to the hand tool 12 as oriented in FIG. 1 from the perspective of a user holding the hand tool 12 in a normal operating position; the same will apply to the wand override unit 18. However, it is to be understood that the examples of the present disclosure may assume various alternative orientations, except where expressly specified to the contrary.

The system 10 is configured to: (1) distribute cleaning fluid (which can include water or a mixture of water and another cleaning agent, some non-limiting examples of which include detergent, soap, conditioner, and/or activated hydrogen peroxide) to the skin and/or coat of a pet; (2) agitate and/or massage the cleaning fluid onto the skin and into the pet's coat; and (3) extract used cleaning fluid and debris (which may include dirt, dust, soil, hair, and other debris) from the pet's skin and coat. This process can be completed faster than a traditional bath or shower while utilizing less water and can also leave the pet's coat less wet than a traditional bath or shower. For example, the system 10 is expected to use about forty ounces of liquid to clean a fifty pound dog, whereas a traditional bath would be expected to use significantly more liquid.

The hand tool 12 can be sold with the other components of the system 10 shown in FIG. 1, and can be packaged as a system kit that includes at least the pet bathing hand tool 12, surface cleaning apparatus 14, and hose 16, and can optionally further include the wand override unit 18 and extension hose 20. The system kit can further include written instructions for assembling and/or operating the system 10, and/or a container of cleaning fluid for use with the system 10, such as a cleaning agent configured to be mixed with water. Alternatively, the hand tool 12 can be sold separately and configured to be compatible with various surface cleaning apparatus already on the market, including both portable and full size extraction cleaning machines. In this instance, the hand tool 12 can be packaged as an accessory kit 22 that includes at least the pet bath hand tool 12, the extension hose 20, and the wand override unit 18. The accessory kit 22 can further include written instructions for assembling and/or operating the hand tool 12, and/or a container of cleaning fluid, such as a cleaning agent configured to be mixed with water. The extension hose 20 can include both a suction hose and a fluid delivery hose within the extension hose 20. While not shown, one or more adapters allowing the wand override unit 18 to be compatible with a variety of surface cleaning apparatus can also be provided with the system 10 or accessory kit 22.

Figure 2:
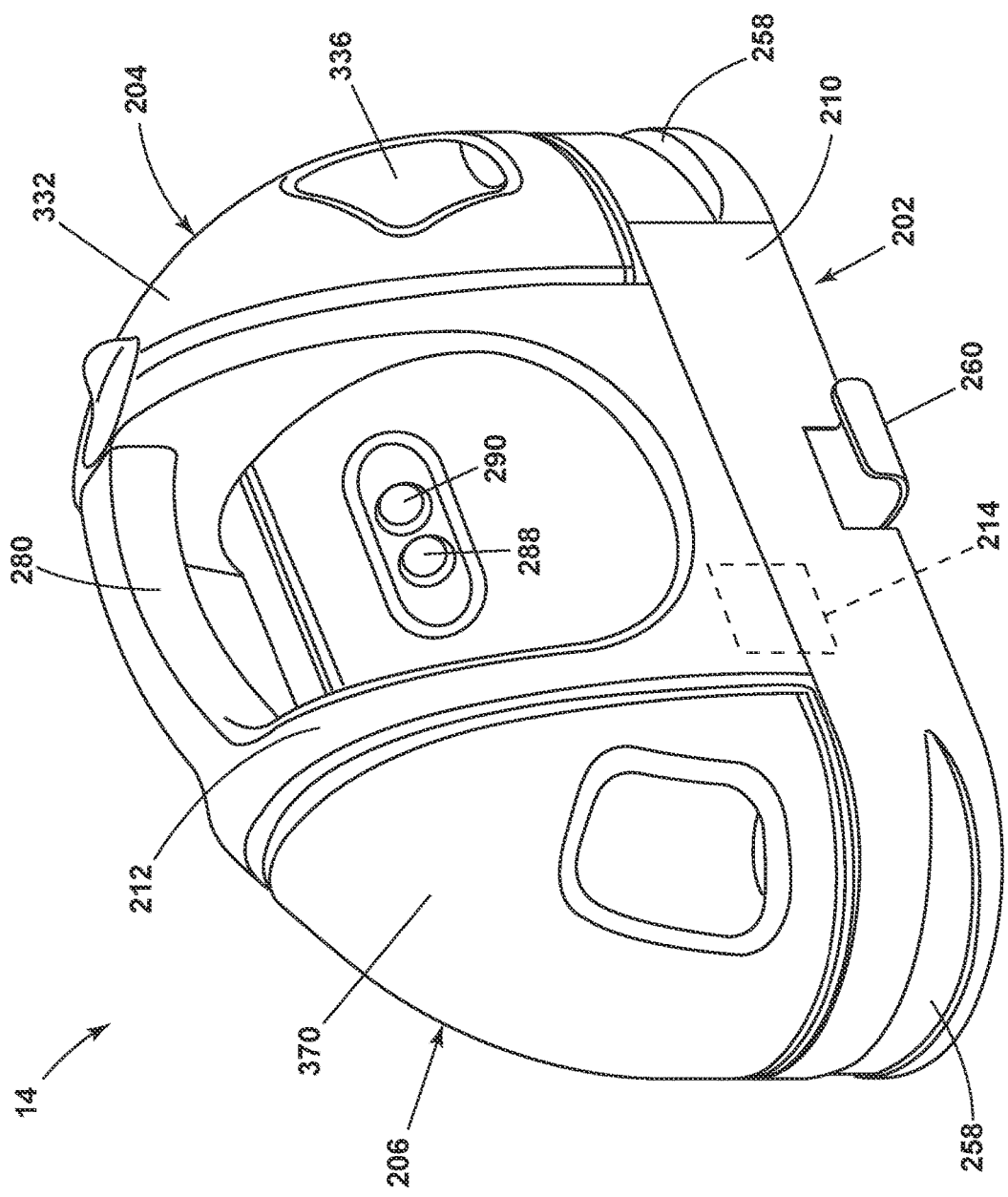
FIG. 2 is a perspective view of a surface cleaning apparatus suitable for use with the pet bathing system of FIG. 1.

FIG. 2 shows a front perspective view of an exemplary surface cleaning apparatus 14 for use within the system 10 of FIG. 1. The surface cleaning apparatus 14 can be a portable deep cleaner or a portable extraction cleaner that includes a fluid delivery system for storing cleaning fluid and delivering the cleaning fluid to the hand tool 12, and a fluid recovery system for removing the spent cleaning fluid and debris via the hand tool 12 and storing the used cleaning fluid and debris on-board the surface cleaning apparatus 14. Examples of a suitable surface cleaning apparatus 14 for the system 10 are set forth in detail in U.S. Pat. No. 7,073,226, filed Nov. 27, 2002, and titled "Portable Extraction Cleaner," and U.S. patent application Ser. No. 14/220,595, filed Mar. 20, 2014, and titled "Surface Cleaning Apparatus," and U.S. Pat. No. 6,898,820, filed Jul. 23, 2001, and titled, "Extraction Cleaning with Heating," all of which are incorporated herein by reference in their entirety.

The surface cleaning apparatus disclosed herein is a portable extraction cleaner of the type described in the '226 patent incorporated above. The illustrated surface cleaning apparatus 14 comprises a main housing assembly 202, a recovery tank assembly 204 and a clean solution tank assembly 206. The main housing assembly 202 comprises a housing base 210 and an upper housing shell 212. The housing base 210 can have a flexible suction hose recess 258 on each end thereof, as well as a flexible suction hose clip 260, and can be used to wrap and store the hose 16 on the main housing assembly 202. A housing to base retainer clip (not shown) can act to hold the upper housing shell 212 to the housing base 210. The recovery tank assembly 204 is principally contained within a recovery tank 332 having integrally molded handgrip indentations 336. The clean solution tank assembly 206 is principally contained within a clean solution tank 370 having integrally molded handgrip indentations. In an example, main housing assembly 202 is formed of an opaque material, but can be formed of a translucent or transparent material. The recovery tank 332 and the clean solution tank 370 can be formed of a transparent or tinted translucent material for user viewing of the contents of the tanks.

The upper housing shell 212 includes an integrally molded handle portion 280. The upper housing shell 212 further includes first and second power switches 288, 290 respectively. In one example, power switches 288, 290 selectively direct power to a suction source, solution pump, and a block heater respectively, details of which can be found in the '226 patent incorporated above. Examples without a heater can have only one power switch, or the suction source and solution pump could be controlled independently by separate switches.

The surface cleaning apparatus 14 can comprise a fluid delivery system including components such as a cleaning fluid source, illustrated herein as the clean solution tank assembly 206 storing cleaning fluid, and a pump (not shown) in fluid communication with the clean solution tank assembly 206. The fluid recovery system can further include components such as a suction source 214 and the recovery tank assembly 204 in fluid communication with the suction source 214 (which can be, for example, a motor/fan assembly) and which stores used cleaning fluid and debris. Further details of the surface cleaning apparatus 14 illustrated herein can found in the '226 patent incorporated above.

Returning to FIG. 1, the hose 16 can include individual passages for transporting fresh/unused cleaning fluid from the surface cleaning apparatus 14 to the hand tool 12 and for transporting recovered/used cleaning fluid and debris from the hand tool 12 to the surface cleaning apparatus 14, and so the hose 16 can be considered a component of both the delivery and recovery systems. For example, an outer hose can define a suction pathway for the recovery system, while a smaller, interior tube defines a dispensing pathway for the fluid delivery system; alternatively, two separate conduits can be provided.

Figure 3:
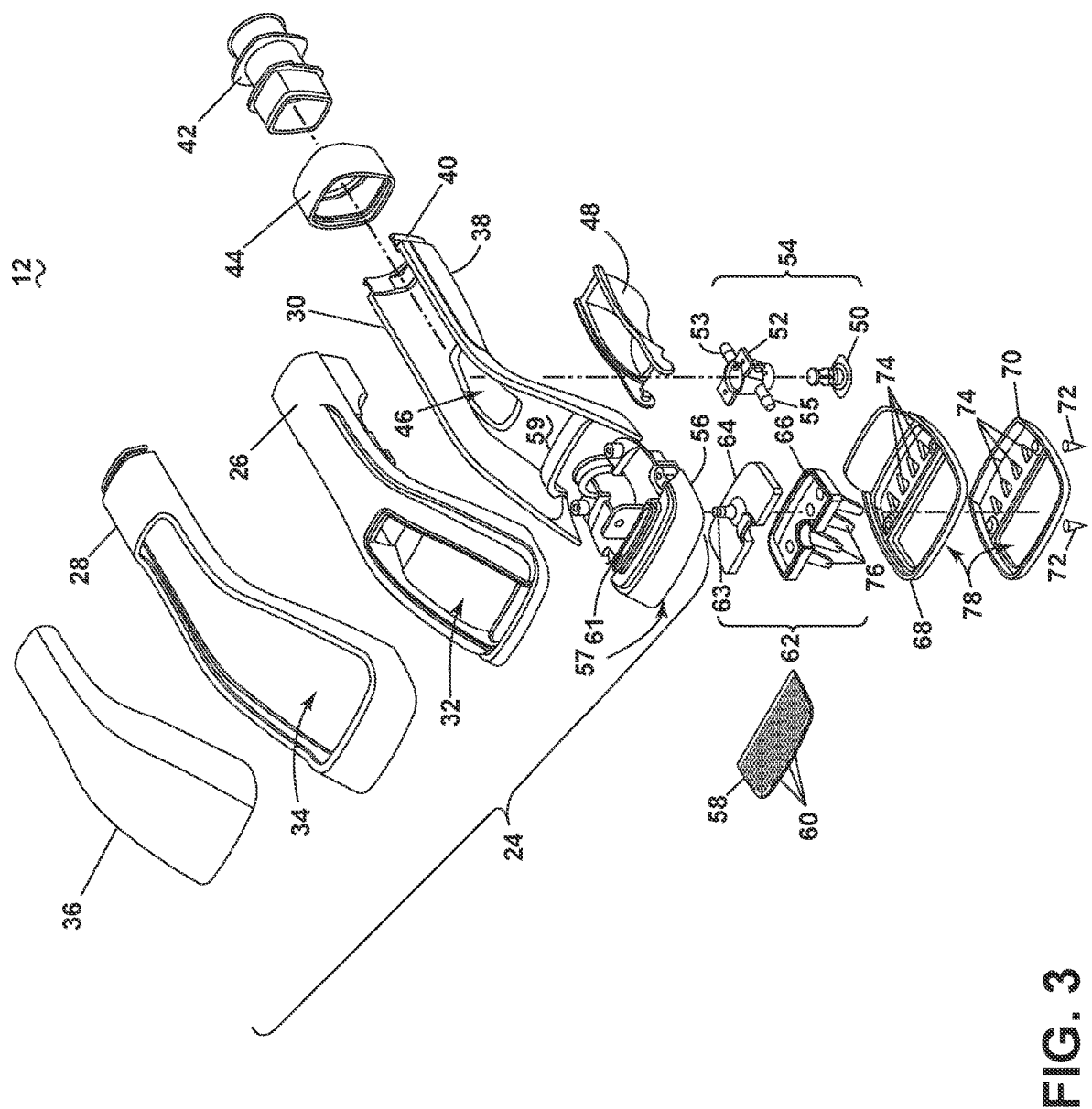
FIG. 3 is an exploded view of a hand tool for the pet bathing system of FIG. 1.

FIG. 3 shows an exploded view of the hand tool 12 for the pet bathing system 10. The hand tool 12 comprises a body 24 that is hand-holdable by a user. The shape of the body 24 is selected such that the body 24 can be easily held within the hand of a user. The body 24 is defined by a housing chassis 26, which is enclosed within a housing comprising an upper housing 28 and a lower housing 30. The lower housing 30 is provided with a grip portion 38 on its lower surface. The grip portion 38 can be formed with a textured or contoured surface so as to improve the ease with which a user can hold onto and manipulate the hand tool 12. The housing chassis 26 has a chassis opening 32 provided on its upper surface that is at least partially aligned with a second opening 34 provided within the upper housing 28. A lens cover 36 is provided that fits into and fluidly seals the second opening 34 of the upper housing 28. The lens cover 36 can be formed of an opaque material, but can also be formed of a translucent, transparent, or tinted translucent material for a user to view an interior of the tool 12 through the lens cover 36. The lens cover 36 can be removably attached to the upper housing 28 or can be non-removably attached to the upper housing 28.

A rear edge 40 of the lower housing 30 is coupled to a hose coupler 42 which attaches the hand tool 12 to the extension hose 20 (FIG. 1). A collar 44 is provided to circumferentially surround the rear edge 40 of the lower housing 30 at the point of connection with the hose coupler 42. The lower housing 30 also has an aperture 46 in its lower surface that can receive a trigger 48. The trigger 48 is operably coupled to a valve to selectively open the valve and allow cleaning fluid to be provided from the hand tool 12, wherein the valve controls the distribution of solution from the hand tool 12 and is normally closed. The valve can comprise a check valve assembly 54 that includes a check valve body 52 and a check valve plunger 50 that is received within the check valve body 52. The check valve body 52 defines a fluid flow path extending from an inlet 53 to an outlet 55, with the fluid flow path being normally closed by the check valve plunger 50. The inlet 53 and outlet 55 can be defined by conduits extending from a central body of the check valve 52. The inlet 53 can be in fluid communication with the fluid delivery conduit 21 (FIG. 6) of the extension hose 20, such as by a flexible conduit or tube attached between the inlet 53 and the fluid delivery conduit 21. The outlet 55 conduit can be in fluid communication with a fluid distributor of the hand tool 12, such as by a flexible conduit or tube attached between the outlet 55 conduit and the fluid distributor. The trigger 48 and the check valve assembly 54 allow distribution of a cleaning or a rinse solution from the fluid delivery system of the surface cleaning apparatus 14 (FIG. 2) to be operated remotely from the surface cleaning apparatus 14 and the wand override unit 18. The trigger 48 can be operably coupled with the check valve plunger 50, such that squeezing the trigger 48 raises the check valve plunger 50 to open the check valve assembly 54, and allow solution to flow through the check valve body 52.

Figure 6:
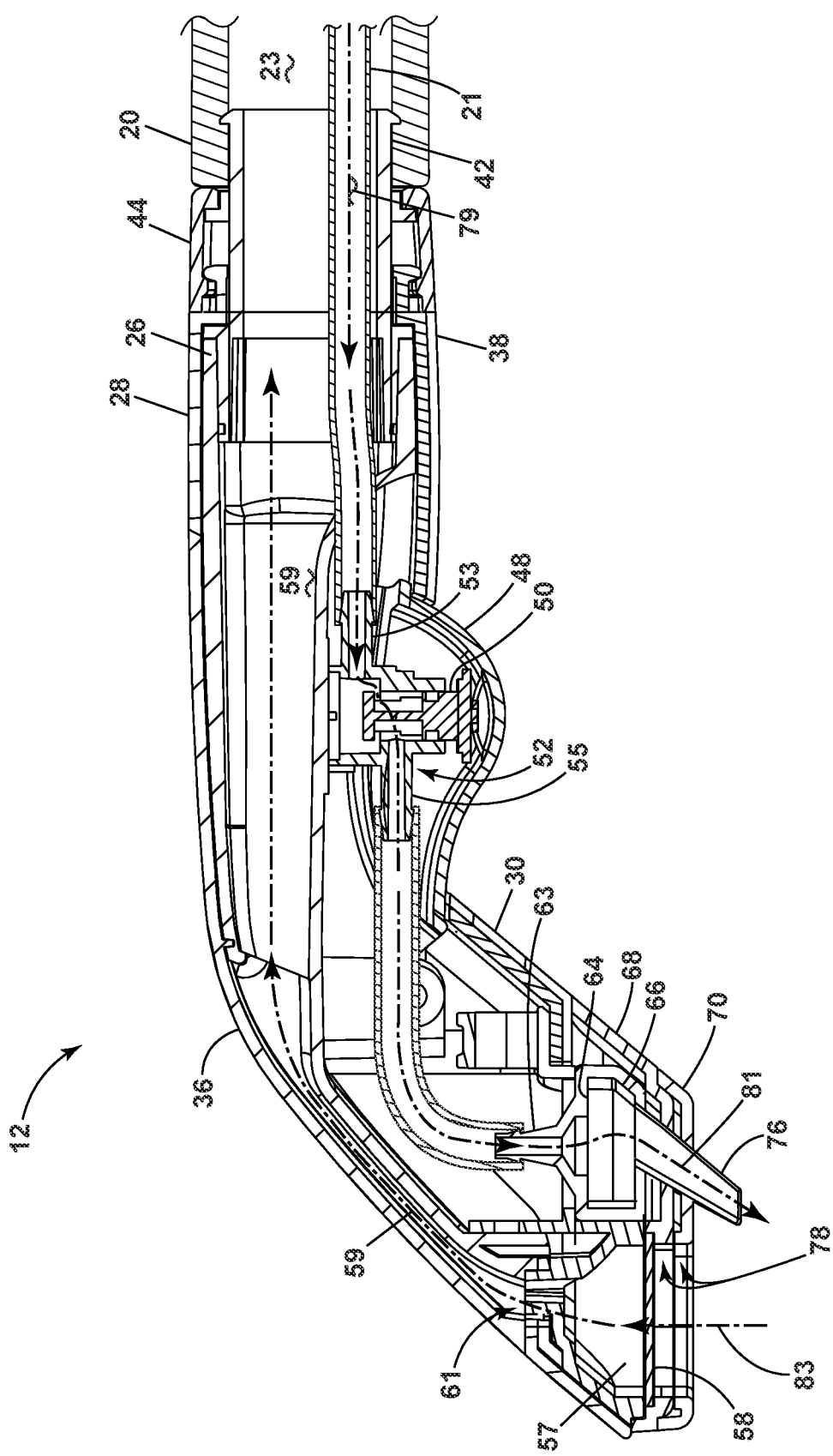
FIG. 6 is a cross-sectional view through the hand tool from FIG. 1.

The hand tool 12 further comprises a suction nozzle 57 having a nozzle inlet defining an inlet to and in fluid communication with the recovery pathway of the system 10. The suction nozzle 57 is adapted to be in fluid communication with the suction source 214 (FIG. 2) of the surface cleaning apparatus 14. The suction nozzle 57 can be operably coupled to the suction source 214 via the extension hose 20, wand override unit 18 and hose 16. The suction nozzle 57 is in fluid communication with the suction conduit 23 of the extension hose 20 via a suction pathway 59 of the tool 12 (FIG. 6). The suction pathway 59 can defined by portions of the housing chassis 26, the upper housing 28, and the lens cover 36, and extends from a nozzle outlet 61 of the suction nozzle 57 through the housing 84, and to the extension hose 20.

The body 24 of the hand tool 12 can be further coupled to a manifold chassis 56. The manifold chassis 56 can define the suction nozzle 57 of the hand tool 12, or the suction nozzle 57 can be separately formed from the chassis 56. A screen 58 can be attached to the manifold chassis 56, at or adjacent to the suction nozzle 57. For example, the screen 58 can be positioned within the suction nozzle 57, between the inlet and the nozzle outlet 61. The screen 58 can be formed of a fine mesh having a plurality of perforations 60. The perforations 60 allow used cleaning or rinsing fluid to be ingested into the hand tool 12 while the screen 58 filters larger particles, such as fur, hair or other large debris, preventing the debris from moving past the screen 58 and into the body 24 of the hand tool 12.

The manifold chassis 56 further includes an attachment point for the fluid distributor, of the hand tool 12, which is shown in the present example as a spray nozzle manifold assembly 62. The manifold assembly 62 comprises an upper manifold portion 64 and a lower manifold portion 66. The upper manifold portion 64 attaches to the manifold chassis 56. The lower manifold portion 66 can be attached to the upper manifold portion 64 by at least one fastener (not shown) or by another attachment technique such as ultrasonic welding, for example. The lower manifold portion 66 comprises at least one outlet for dispensing solution onto a pet. As shown, the outlet comprises a plurality of spray nozzles 76 that protrude from the lower surface of the lower manifold portion 66. The manifold assembly 62 is further provided with a manifold inlet 63 that is in fluid communication with the spray nozzles 76, as well as the outlet 55 of the check valve body 52. The spray nozzles 76 can be formed out of any suitable material that is rigid and chemically resistant, such as thermoplastic resins like Noryl, Polyphenylene ether (PPE), or Polyoxymethylene (POM), for example. The individual spray nozzles 76 can be spaced apart and protrude downwardly from the lower manifold portion 66 like teeth or tines of a comb. In this way, the spray nozzles 76 can act to separate and comb through a pet's coat during the pet bathing process. In one example, the spray nozzles 76 protrude from the lower manifold portion 66 at an angle relative to the flat surface of the lower manifold portion 66, rather than being perpendicular to the lower manifold portion 66. It will also be understood that configurations of a fluid distributor other than the spray nozzle manifold assembly 62 described herein could be used, or even that multiple fluid distributors could be incorporated.

The hand tool 12 further comprises at least one grooming guard for user adjustability of the exposed length of the spray nozzles 76. The grooming guard(s) can comprise different thicknesses for accommodating different pet coat types having varying characteristics such as hair length and density. For example, a thinner grooming guard exposes a longer portion of the spray nozzles 76, which is desirable when bathing pets having a longer, thicker coat because longer spray nozzles 76 are better able to penetrate the pet's coat and distribute cleaning solution to the base of the coat and onto the pet's skin, which improves cleaning efficacy. Conversely, a thicker grooming guard exposes a shorter portion of the spray nozzles 76, which is desirable when bathing pets having a shorter coat, because shorter spray nozzles 76 are less prone to scratching the pet's skin, but still effectively distributing cleaning solution onto the base of the coat and skin.

In the illustrated example, the hand tool 12 is provided two grooming guards, illustrated herein as a main plate 68 and an outer plate 70. The main plate 68 and the outer plate 70 can be removably coupled with the manifold chassis 56 over the manifold assembly 62, either individually for longer or medium length pet coats, or alternatively, the main plate 68 and outer plate 70 can be stacked together and coupled to the manifold chassis 56 together for shorter pet coat lengths. Both the main plate 68 and the outer plate 70 have a plurality of apertures 74 through which the spray nozzles 76 of the lower manifold portion 66 can protrude when the main plate 68 and/or outer plate 70 are coupled with the manifold assembly 62. Both the main plate 68 and the outer plate 70 also have a suction opening 78 which aligns with the suction nozzle 57 when the main plate 68 and outer plate 70 are coupled with the manifold chassis 56 and exposes at least a portion of the screen 58. The main plate 68 and the outer plate 70 can be attached to the manifold assembly 62 by at least one fastener 72. The fastener 72 can be any suitable fastening means for attaching the plates 68, 70, non-limiting examples of which include snap-fit fasteners or screws. Instead of fasteners, the main plate 68 and the outer plate 70 can be attached to the manifold assembly 62 by a snap fit connection with the body 24 of the hand tool 12. It will be understood that, while the hand tool 12 is described herein as being provided with two grooming guards, additional grooming guards can be provided for use on pets having varying coat lengths, or only a single grooming guard can be provided. Furthermore, while the spray nozzles 76 are illustrated herein as being provided on the manifold assembly 62, it is also contemplated that the spray nozzles 76 can be provided on at least one of the grooming guards.

Figure 4:
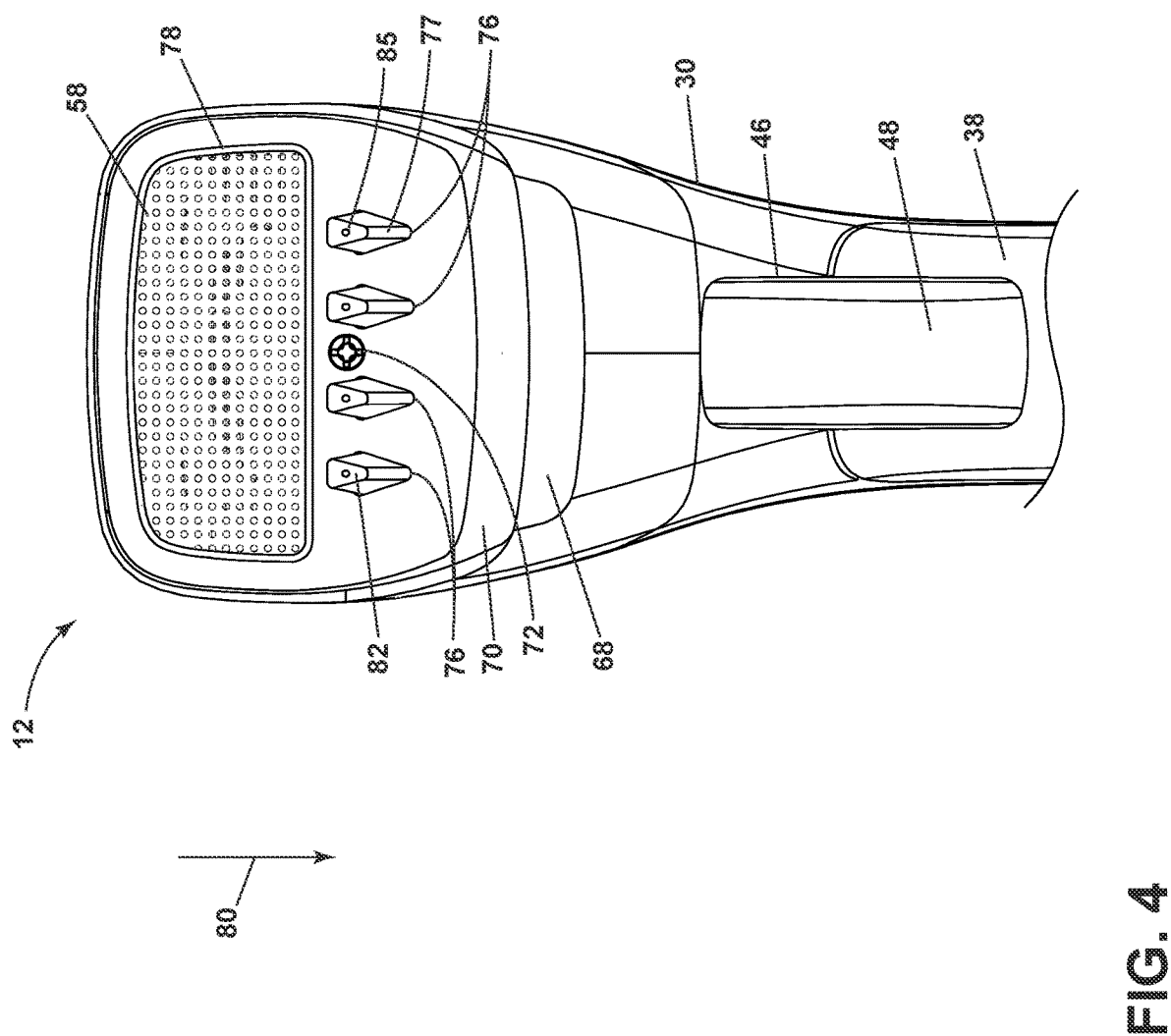
FIG. 4 is a bottom view of a portion of the hand tool from FIG. 1.

FIG. 4 shows a bottom view of a portion of the hand tool 12 from FIG. 1. The trigger 48 is received within the aperture 46 in the lower housing 30. The grip portion 38 can also at least partially surround the aperture 46 and the trigger 48. The main plate 68 is in place, attached to the manifold assembly 62. The outer plate 70 is also installed over the spray nozzles 76 of the lower manifold portion 66. The outer plate 70 is attached to the main plate 68 and/or to the manifold assembly 62 by the fasteners 72. While the outer plate 70 is illustrated herein as being held in plate by two fasteners 72 arranged on the outer edges of the outer plate 70, it will also be understood that any number and arrangement of fasteners 72 could be used to attach the outer plate 70 to the main plate 68, including, for example, a single fastener 72 placed at any suitable location on the outer plate 70.

Suction openings 78 through both the outer plate 70 and the main plate 68 are aligned with each other and with the screen 58. Each suction opening 78 is generally shaped and oriented such that it corresponds to at least a portion of the shape and orientation of the screen 58, such that at least a portion of the screen 58 can be seen through and is accessible through the suction opening 78.

In one example, the spray nozzles 76 can have a shape that is generally wedge shaped or furrow shaped. In one example, the narrowest point of the spray nozzles 76 is oriented in the same direction as the direction of the cleaning stroke movement, as illustrated by arrow 80, to define a wedge-shaped leading edge 77. The wedge-shaped leading edge 77 of the spray nozzles 76 divide and comb through a pet's coat to maximize cleaning performance by distributing solution deep into the pet's coat, preferably at the base of the coat onto the pet's skin. In addition to being wedge-shaped, the leading edge 77 is angled away from the direction 80 of the cleaning stroke movement creating a chamfer or lead-in that reduces the pulling-force on the pet's coat, making the bathing experience more comfortable for the pet. The spray nozzles 76 can also act as agitators to aid in working the dispensed solution into the pet's skin and coat to maximize cleaning performance.

The spray nozzles 76 terminate in a flat surface 82. The flat surface 82 can be generally parallel to the outer plate 70 or the main plate 68, although it will also be understood that the flat surface 82 of the spray nozzles 76 need not be perfectly parallel, but could be provided at an angle relative to the surface of the outer plate 70 or the main plate 68, or could be rounded. At least one fluid outlet 85 is provided in the flat surface 82 of the spray nozzles 76. While the spray nozzles 76 are illustrated herein as having only one fluid outlet 85 per spray nozzle 76, it will also be understood that each spray nozzle 76 could have more than one fluid outlet 85 located on its flat surface 82. Alternatively, each spray nozzle 76 could have at least one fluid outlet 85 located on a vertical surface of the spray nozzle 76, in such a configuration as is set forth in detail in U.S. Pat. No. 8,991,000, filed Dec. 2, 2010, and titled, "Low Moisture Extraction Deep Cleaning," which is incorporated herein by reference in its entirety. Furthermore, while the fluid outlets 85 are illustrated herein as being integral with the wedge-shaped spray nozzles 76, it is also contemplated that the fluid outlets 85 could be located at a location other than on the wedge-shaped spray nozzles 76. For example, the fluid outlets 85 could be provided as openings on the surface of the lower manifold portion 66, with wedge-shaped structures protruding elsewhere from the lower manifold portion 66 and not containing fluid outlets 85. While it is beneficial to provide the fluid outlets 85 in combination with comb-like features such as the wedge-shaped spray nozzles 76 shown herein to apply fluid closer to the pet's skin, it is also contemplated that the hand tool 12 can have separate fluid outlets and combing features.

FIGS. 5A and 5B show side views of a portion of the hand tool 12. In FIG. 5A, both the main plate 68 and the outer plate 70 are installed on tool 12 in a stacked arrangement, with the spray nozzles 76 extending beyond the outer plate 70. In FIG. 5B, only the main plate 68 is installed, with the outer plate 70 not present. When only the main plate 68 is installed, without the outer plate 70, a greater portion of the spray nozzles 76 are exposed, such that the spray nozzles 76 have a longer or greater effective length than when the outer plate 70 is also installed (FIG. 5A). Since the user has the ability to vary the effective length of the spray nozzles 76 by selecting the grooming guards, the hand tool 12 can accommodate pet bathing for animals with coats of varying thicknesses or fullnesses. For example, for bathing a pet with relatively short fur, both the main plate 68 and the outer plate 70 can be installed as the distance required from the coat to the skin is relatively short. However, for bathing a pet with longer fur or a fuller coat, a user may choose to install only the main plate 68, leaving a greater effective length of the spray nozzles 76 exposed beyond the main plate 68, allowing the spray nozzles 76 to reach the pet's skin even though the coat is longer or thicker.

FIG. 6 shows a cross-sectional view through the hand tool 12 in which the assembled relationships of the parts shown in FIG. 3 is visible. The check valve plunger 50 is inserted within the check valve body 52. The check valve plunger 50 is biased against the inner surface of the trigger 48, such that it is operably coupled with the trigger 48 to be moved upwardly within the check valve body 52 when the trigger 48 is depressed, as it is shown in FIG. 6. When the trigger 48 is depressed and the check valve plunger 50 is moved upwardly within the check valve body 52, solution can be dispensed along a fluid dispensing pathway 79, extending from the fluid delivery conduit 21 to the inlet 53 of the check valve body 52 via a conduit, then from the outlet 55 of the check valve body 52 to the manifold inlet 63 via a conduit, and then through the spray nozzles 76, as indicated by arrow 81. The housing chassis 26, together with the upper housing 28 and lens cover 36, define a recovery or suction flow path, indicated by arrow 83, within the suction pathway 59, through which used cleaning or rinsing fluid and debris is ingested into the hand tool 12 and flows through the suction conduit 23 of the extension hose 20 and back to the recovery tank assembly 204 of the surface cleaning apparatus 14 (FIG. 1). As suction is drawn by the suction source 214 (FIG. 2), used cleaning or rinsing fluid and debris is sucked up into the suction nozzle 57, passing through the screen 58 and into the interior of the hand tool 12. The used cleaning or rinsing fluid and debris then flows through the nozzle outlet 61 into suction pathway 59 along the flow path 83, passing through the hose coupler 42 and into the suction conduit 23.

Figure 7:
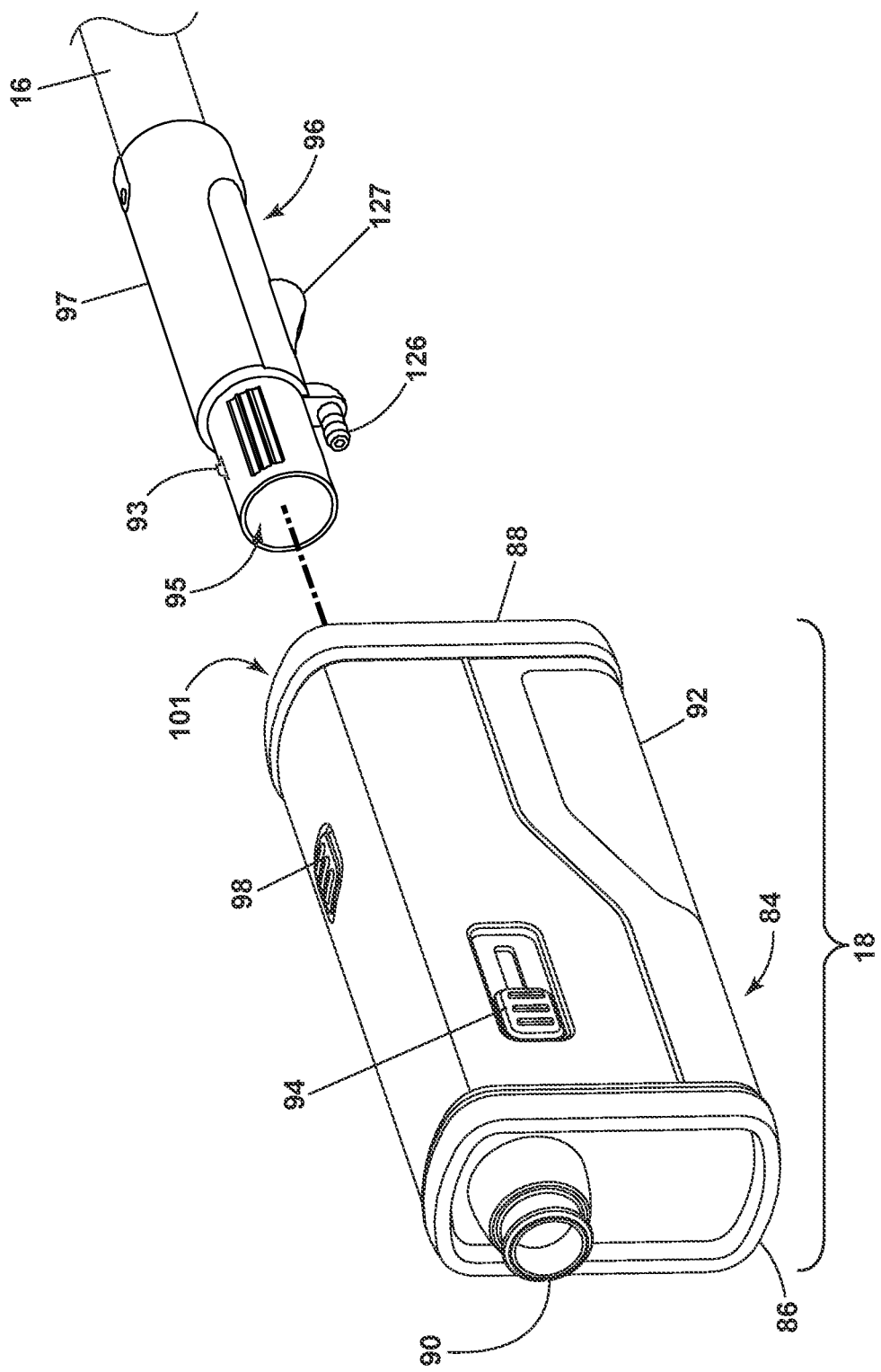
FIG. 7 is a perspective view of a wand override unit for the pet bathing system of FIG. 1.

FIG. 7 shows a perspective view of the wand override unit 18 for the pet bathing system 10 of FIG. 1. The wand override unit 18 comprises a housing 84 having a second or front end cap 86 and a first or rear end cap 88. Both end caps 86, 88 can have a height that is greater than the height of the housing 84, such that when the wand override unit 18 is placed upon a surface, the end caps 86, 88 extend outwardly from the housing 84 such that only the end caps 86, 88 contact the surface upon which the wand override unit 18 rests. This can improve durability and reduce wear on the wand override unit 18. A second coupler, illustrated herein as a hose connector 90, is provided on the housing 84 and protrudes from the front end cap 86. The hose connector 90 is adapted to be coupled with the hand tool 12 by coupling the wand override unit 18 with the extension hose 20 (FIG. 1). A mode selector 94 is provided on the housing 84.

The rear end cap 88 is adapted to receive a wand 96 coupled with the hose 16 from the surface cleaning apparatus 14 (FIG. 1). The wand 96 can be provided with and considered as a component of the surface cleaning apparatus 14 and is coupled with the suction source 214 and the clean solution tank assembly 206. The wand 96 can be inserted through the rear end cap 88 into the interior of the housing 84, where the wand 96 couples with the wand override unit 18 via a depressible detent 93 present on the wand 96. This allows the accessory kit 22 to be compatible with a variety of surface cleaning apparatus 14 such as upright, portable or handheld extraction cleaners, for example, that can include a similar wand structure with a detent 93 that can be inserted into the wand override unit 18. The housing 84 further comprises a wand release button 98 that can selectively couple an inserted wand 96 with the wand override unit 18. The wand release button 98 can automatically lock the detent 93 of the wand 96 upon insertion into the wand override unit 18, and can be configured to release the detent 93 of the wand 96 upon depressing the button 98.

The housing 84 further includes a cleaning solution reservoir that is carried by the housing 84, illustrated herein as a refillable reservoir 92. In an one example, the housing 84 is formed of an opaque material, but can be formed of a translucent or transparent material. The reservoir 92 can be formed of a transparent or tinted translucent material for user viewing of the contents of the reservoir 92. The reservoir 92 can contain a cleaning solution, which can be any solution desired by the user to use for pet bathing, non-limiting examples of which include a detergent, soap, conditioner, or activated hydrogen peroxide. The reservoir 92 can have any suitable volume in order to contain a sufficient or desired amount of a detergent, soap, conditioner, hydrogen peroxide, etc. for bathing a pet. In an one example, the reservoir 92 can contain approximately ten ounces of a desired detergent or cleaning fluid. The reservoir 92 can be removably or non-removably contained within the housing 84. In the case where the reservoir 92 is removably contained within the housing 84, it is also contemplated that the reservoir 92 could be a disposable or replaceable cartridge that comes pre-filled with a cleaning fluid. The cartridges can further be pre-filled with cleaning fluid configured for particular types or breeds of pets, and/or for particular cleaning needs, i.e. sensitive skin, moisturizing, odor reducing, etc.

The wand 96 comprises a wand housing 97, illustrated herein as having the shape of a tube or conduit that defines a wand interior 95. The wand interior 95 defines at least a portion of the recovery pathway between the hand tool 12 and the surface cleaning apparatus 14. The wand 96 is further provided with a fluid delivery nozzle 126 that defines at least a portion of the fluid delivery pathway between the surface cleaning apparatus 14 and the hand tool 12. A wand trigger 127 is provided and protrudes from the lower surface of the wand 96 when it is in the correct orientation to be inserted into the wand override unit 18.

Figure 8:
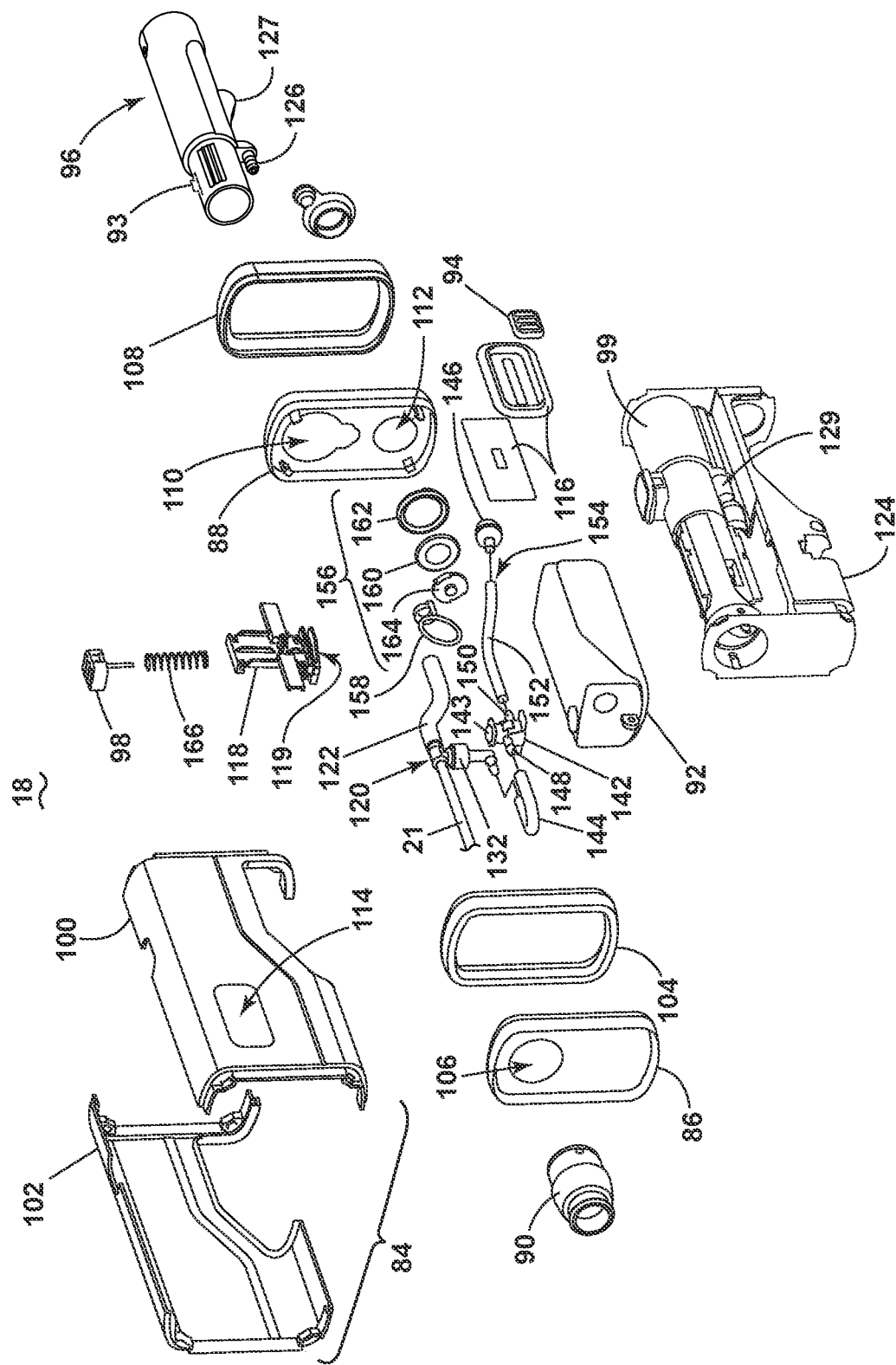
FIG. 8 is an exploded view of the wand override unit from FIG. 7.

FIG. 8 shows an exploded view of the wand override unit 18. The housing 84 comprises a left shroud assembly 100 and a right shroud assembly 102. The left and right shroud assemblies 100, 102 couple together to form the housing 84 and define an interior of the wand override unit 18, together with the front end cap 86 and the rear end cap 88. The front end cap 86 can be circumferentially surrounded by a first end cap overmold 104. The front end cap 86 also includes an opening 106 within which the hose connector 90 is received to couple the wand override unit 18 with the extension hose 20. The rear end cap 88 can be circumferentially surrounded by a second end cap overmold 108. The rear end cap 88 further comprises a keyhole-shaped opening 110 and a second opening 112. The keyhole-shaped opening 110 is adapted to at least partially receive the wand 96 of the surface cleaning apparatus 14, and can comprise other opening shapes in order to accommodate the shape of the wand 96. The second opening 112 provides access to the interior of the reservoir 92 from the exterior of the housing 84 in order to fill or empty the reservoir 92.

The left shroud assembly 100 includes an aperture 114 for receiving the mode selector 94. The mode selector 94 can be any suitable type of selector that allows a user to select a cleaning mode. In one example, the mode selector 94 can be slidably received within the aperture 114. It will also be understood that the mode selector 94, rather than being slidable, can also be a push button or a toggle switch, by non-limiting example. The mode selector 94 can allow a user to select, for example, a heavy wash mode in which a mixture of cleaning solution from the reservoir 92 and cleaning fluid from the apparatus 14 is dispensed from the hand tool 12, a light wash mode which is similar to the heavy wash mode except that the mixture dispensed can have a lower concentration of cleaning solution from the reservoir 92, or a rinse mode in which only cleaning fluid from the apparatus 14 is dispensed from the hand tool 12 and no cleaning solution from the reservoir 92 is used. In one contemplated use, the reservoir 92 can be filled with a pet shampoo or other pet treatment agent, and the clean solution tank assembly 206 of the apparatus 14 can be filled with water.

The mode selector 94 is operably coupled with a movable regulator 118 in order to vary the rate at which cleaning solution is dispensed from the reservoir 92. The movable regulator 118 can move between a plurality of predefined positions that correspond to the rate at which cleaning solution is dispensed from the reservoir 92, non-limiting examples of which can include a high rate (e.g. heavy wash mode as described above), low rate (e.g. light wash mode as described above), or zero rate (e.g. rinse mode as described above). In the illustrated example, the mode selector 94 is received within a selector housing 116 and operably coupled to the movable regulator 118. The movable regulator 118 has an angled lower wall 119. The movable regulator 118 is further operably coupled to a solution mixing check valve 142, specifically to a plunger 143 incorporated in the solution mixing check valve 142 to allow for adjustability of the concentration of solution being drawn from the reservoir 92 through the solution mixing check valve 142. When the plunger 143 is not depressed, the solution mixing check valve 142 is closed. When the plunger 143 is fully depressed, the solution mixing check valve 142 is fully open. The plunger 143 can also be partially depressed, placing the solution mixing check valve 142 in a partially opened state. It is also contemplated that the solution mixing check valve 142 can have more than one partially opened states corresponding to varying degrees of openness. While the solution mixing check valve 142 is described herein as being adjustable between a discrete number of positions, including at least a closed state, a partially opened state, and a fully open state, it is also contemplated that the solution mixing check valve 142 can be continuously adjustable between a fully closed and fully opened position.

The movable regulator 118 is slidable relative to the hose frame 124 such that when a user slides the mode selector 94 forwardly or rearwardly within the selector housing 116, the movable regulator 118 is correspondingly slid forward or rearward within the hose frame 124. The movable regulator 118 is positioned directly above the plunger 143 of the solution mixing check valve 142 and selectively contacts the plunger 143. For example, when the movable regulator 118 is in a rearward most position, it does not contact the plunger 143, leaving the solution mixing check valve 142 in the fully closed position, corresponding to a rinse mode.

When the movable regulator 118 is moved forward, the angled lower wall 119 comes into contact with the plunger 143, depressing it more as the movable regulator 118 is moved into a forwardmost position. With the movable regulator 118 in a forwardmost position, the angled lower wall 119 fully depresses the plunger 143, placing the solution mixing check valve 142 in a fully opened position, corresponding to a heavy wash mode. With the movable regulator 118 stopped in a middle position, between the forwardmost and rearward most positions, the angled lower wall 119 partially depresses the plunger 143, placing the solution mixing check valve 142 in a partially opened position, corresponding to a light wash mode. It is noted that while three positions of the mode selector 94/movable regulator 118, and therefore three wash modes, are disclosed herein, the wand override unit 18 can be provided with any number of wash modes, including less than three or more than three, such that the modes for selection on the mode selector 94 correspond to at least the closed state, the partially opened state, and the fully opened state of the solution mixing check valve 142.

An inlet 150 of the solution mixing check valve is fluidly coupled to the interior of the reservoir 92 via a reservoir tube 152. The end of the reservoir tube 152 that is not coupled to the solution mixing check valve 142 defines a solution inlet 154. The solution inlet 154 is in fluid communication with the interior of the reservoir 92 to selectively allow cleaning solution from the reservoir 92 to be supplied to a venturi assembly 120. The solution inlet 154 of the reservoir tube 152 can be further coupled with a tube weight 146 to improve uptake of fluid from the reservoir 92 even when fluid levels within the reservoir 92 are low or when the wand override unit 18 is inverted. A grommet (not shown) can be provided to prevent leaking of fluid where the reservoir tube 152 enters the reservoir 92. An outlet 148 of the solution mixing check valve 142 is fluidly coupled to the venturi assembly 120 via a conduit 144.

The venturi assembly 120 is fluidly coupled to an inlet conduit 122. The opposite end of the inlet conduit 122 is fluidly coupled with the fluid delivery nozzle 126 of the wand 96 via a hose frame 124 that is contained within the housing 84. The venturi assembly 120 is also fluidly coupled to the fluid delivery conduit 21 contained within the extension hose 20.

While the coupling and fluid connection between the wand override unit 18 and the hand tool 12 via the extension hose 20 is illustrated herein as being a non-detachable or permanent coupling due to the fluid delivery conduit 21 that is shared between the wand override unit 18, the extension hose 20, and the hand tool 12, in other examples the connection need not be non-detachable or permanent. In other examples of the present disclosure, the connection can be detachable, such as by a detachable fluid connection that can be made at, by way of non-limiting example, the hose connector 90 that couples the wand override unit 18 with the extension hose 20, the hose coupler 42 which attaches the hand tool 12 to the extension hose 20, at both ends of the extension hose 20, or at any other suitable location along the length of the fluid delivery conduit 21.

At the rear end of the reservoir 92 is a through opening (not shown) that allows a user access to the reservoir 92 to provide cleaning fluid to the reservoir 92. The through opening can be provided with a tank seal and cap assembly 156 to selectively prevent cleaning fluid from leaking out of the reservoir 92. The tank seal and cap assembly 156 can include, for example, a seal 160, a gasket 162, and a cap 164. A cap tether 158 can also be provided to ensure that the cap 164 will not be lost when the cap 164 is detached from the reservoir 92 to allow cleaning fluid to be added to or removed from the reservoir 92.

The upper surfaces of the left shroud assembly 100 and the right shroud assembly 102 are shaped such that they surround the wand release button 98. The wand release button 98 is operably coupled to the hose frame 124 via a spring 166 in order to selectively couple an inserted wand 96 with the wand override unit 18. Upon insertion of the wand 96 into the wand override unit 18, the spring 166 automatically biases the wand release button 98 toward a locked position, shown in FIG. 10, in which the depressible detent 93 is received within the interior of the spring 166 and is not being depressed by the wand release button 98, such that the wand 96 cannot be easily removed from the wand override unit 18. Upon depression of the wand release button 98, the wand override unit 18 can be configured to release the wand 96 such that it can be removed from the wand override unit 18 because the wand release button 98 applies downward pressure on the depressible detent 93, allowing the wand 96 to be pulled backward out of the wand override unit 18.

Figure 9:
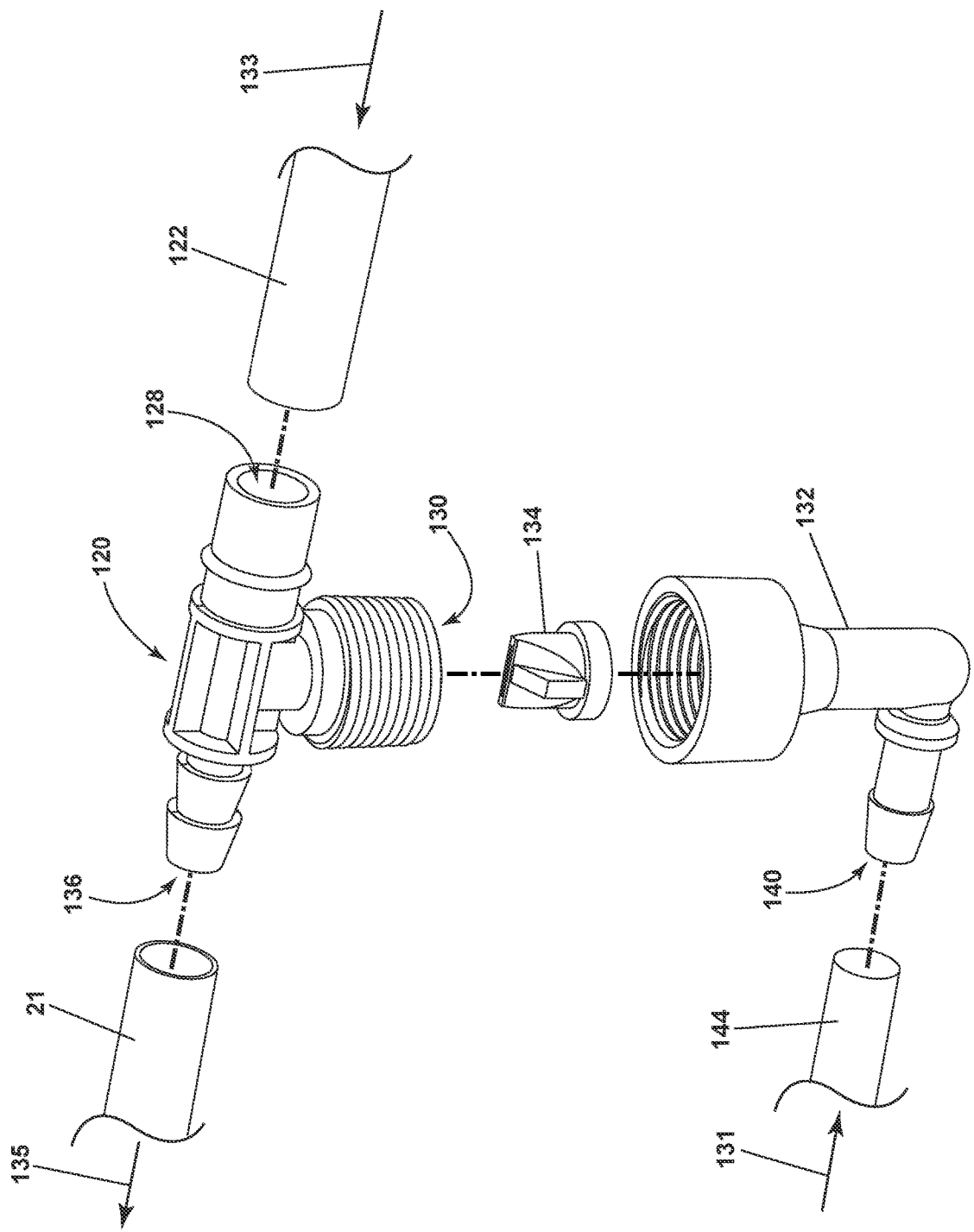
FIG. 9 is an exploded view of a venturi assembly for use in the wand override unit from FIG. 7.

FIG. 9 shows an enlarged and exploded view of the venturi assembly 120 for use in the wand override unit 18. The venturi assembly 120 includes a venturi body defining a hollow interior and having a rear inlet 128, a lower inlet 130, and an outlet 136, all of which are in fluid communication with the hollow interior. The rear inlet 128 is fluidly coupled with the inlet conduit 122 to allow fluid that flows from the clean solution tank assembly 206 of the surface cleaning apparatus 14 toward the venturi assembly 120 in the direction of arrow 133 to enter the venturi assembly 120. The outlet 136 is fluidly coupled with the fluid delivery conduit 21 to allow fluid to flow out of the outlet 136 and toward the spray nozzles 76 in the direction of arrow 135. The lower inlet 130 of the venturi body is fluidly coupled and threadably engaged with a solution inlet conduit 132. The solution inlet conduit 132 includes an inlet 140 coupled to a conduit 144 that is further coupled with the reservoir 92 via the solution mixing check valve 142 to allow fluid to flow from the reservoir 92 toward the conduit 144 in the direction of arrow 131. A duckbill valve 134 is provided within the venturi assembly 120 and allows fluid from the reservoir 92 to flow through the solution inlet conduit 132 and into the venturi body, while adapted to prevent the backflow of fluid that has entered the second fluid delivery pathway, specifically the venturi assembly 120 through the rear inlet 128 into the solution inlet conduit 132 and the reservoir 92.

Figure 10:
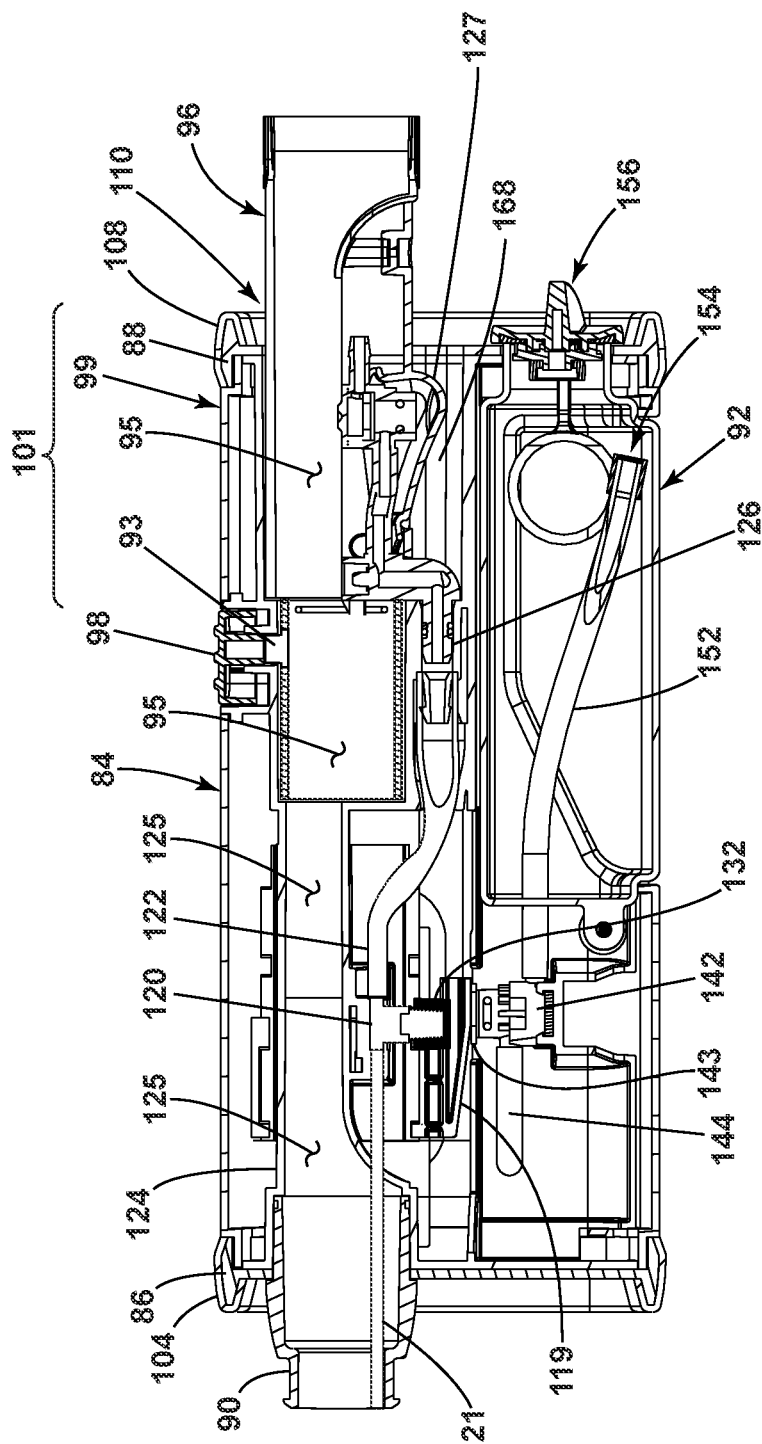
FIG. 10 is a cross-sectional view through the wand override unit from FIG. 7.
Figure 11:
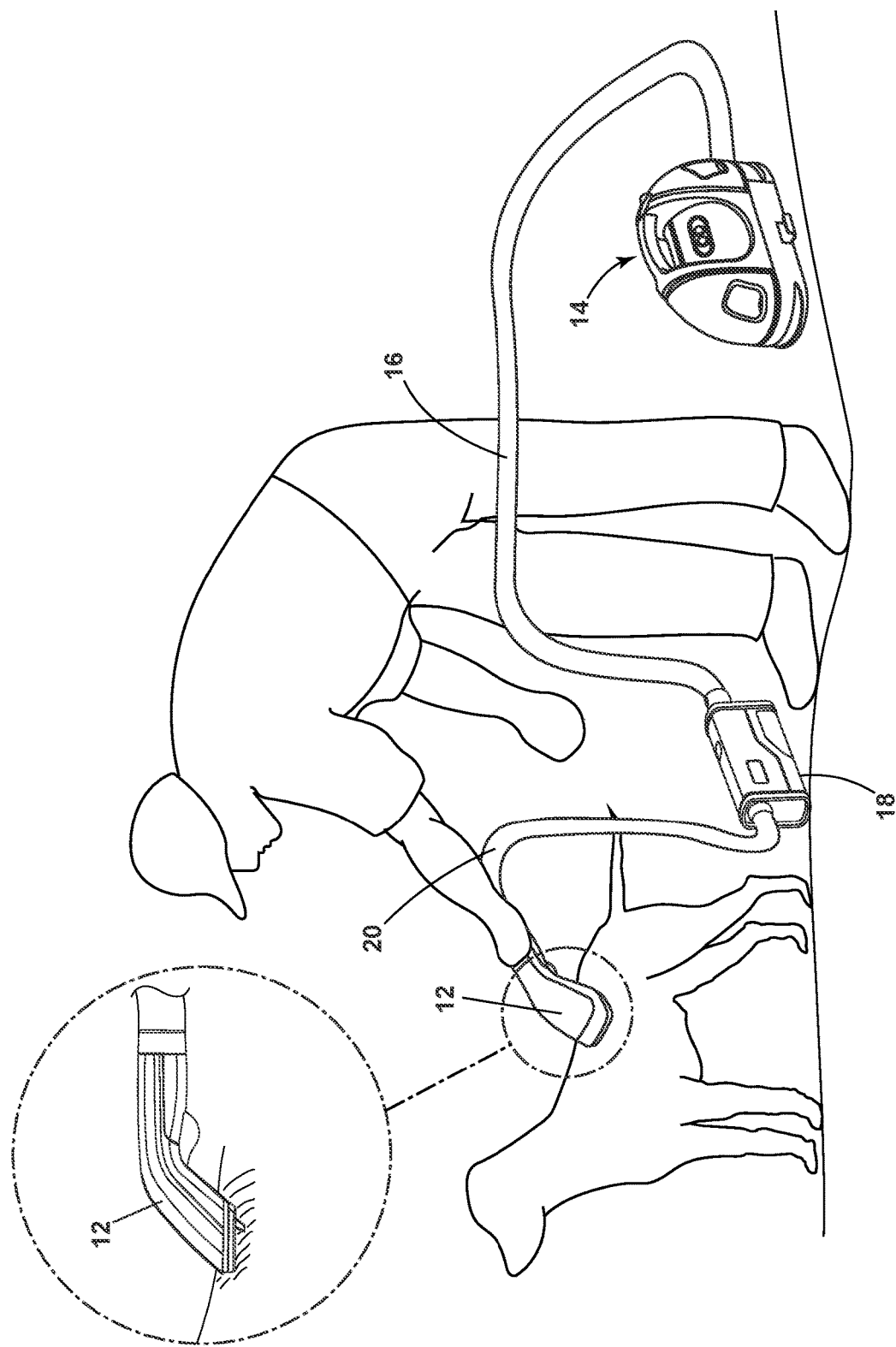
FIG. 11 is a perspective view of the pet bathing system of FIG. 1 being used to bathe a pet by a user.

FIG. 10 shows a cross-sectional view through the wand override unit 18. When the wand 96 from a surface cleaning apparatus 14 is inserted into the wand override unit 18, the keyhole-shaped opening 110 allows for the wand trigger 127 of the wand 96 to be initially inserted without physical displacement or mechanical depression of the wand trigger 127, which prevents fluid from being accidentally dispensed from the fluid delivery nozzle 126. As the wand 96 moves further into the wand override unit 18, the fluid delivery nozzle 126 fluidly couples to the inlet conduit 122 creating a fluid flow path and the wand trigger 127 comes into contact with a ramp structure 168 within the hose frame 124 that is adapted to actuate the wand trigger 127 by causing physical displacement or mechanical depression of the wand trigger 127. When the wand 96 is fully inserted within the wand override unit 18, as shown in FIG. 10, the wand trigger 127 is fully depressed. This opens the fluid delivery pathway from the surface cleaning apparatus 14 to the check valve assembly 54. Dispensing fluid from the hand tool 12 is now controlled by the trigger 48 of the hand tool 12 and in this way is operated remotely from the wand 96 of the surface cleaning apparatus 14. If the trigger 48 is not mechanically depressed by a user, fluid will not flow past the check valve assembly 54 and out of the hand tool 12.

Optionally, cleaning solution from the reservoir 92 can be added to the cleaning fluid from the surface cleaning apparatus 14. The user can position the mode selector 94 to set the amount of cleaning solution to be drawn from the reservoir 92. For example, the user can set the mode selector 94 to a wash mode, including, for example a heavy or light wash, in which the solution mixing check valve 142 is at least partially open to allow cleaning solution to be drawn up through the venturi assembly 120 from the reservoir 92. The user can alternately set the mode selector 94 to a rinse mode wherein the solution mixing check valve 142 is closed and no cleaning solution is drawn up from the reservoir 92. While the mode settings selectable by the mode selector 94 have been described herein as being wash or rinse, it will also be understood that the wand override unit 18 can comprise additional settings configured to vary the amount of cleaning fluid drawn up from the reservoir 92, such that, for example, a "light wash" or a "heavy wash" could be selected, or any suitable options therebetween.

When the mode selector 94 is set to the wash mode, cleaning solution can flow from the reservoir through the reservoir tube 152 and through the solution mixing check valve 142. From the solution mixing check valve 142, the cleaning solution can flow through the conduit 144 and into the inlet conduit 132, through the duckbill valve 134, and into the venturi assembly 120. In the venturi assembly 120 the cleaning solution can be drawn into and mixed with fluid dispensed from the wand 96 of the surface cleaning apparatus 14. The mixed solution then flows through the outlet 136 of the venturi assembly 120 and into the fluid delivery conduit 21 contained within the extension hose 20.

The hose frame 124 can include a wand receiving portion 99 to at least partially receive the wand 96 when inserted into the wand override unit 18 and a nozzle receiving portion 129 to receive the fluid delivery nozzle 126 when the wand 96 is inserted into the wand override unit 18. A first or wand coupler can be provided on the housing 84 and comprise a wand receiver 101 that can be thought of as including at least the keyhole-shaped opening 110, the ramp structure 168, the wand interior 95, and the wand receiving portion 99 and is adapted to partially receive the wand 96 and couple the extension hose 16 with the first coupler. In an one example, the first coupler protrudes from the first or rear end cap 88. The hose frame 124 is further configured to define a suction conduit 125 that extends through the wand override unit 18. The suction conduit 125 is in fluid communication with the suction conduit 23 via the hose connector 90. The suction conduit 125 is further in fluid communication with the wand interior 95 when the wand 96 is inserted within the wand override unit 18. The suction conduit 125, together with the wand interior 95 and the wand receiving portion 99, can form a portion of the recovery pathway through the wand override unit 18 that extends through the housing 84 between the first and second couplers. The wand interior 95 is further in fluid communication with the hose 16 (FIG. 1), coupling the recovery pathway to the suction source 214 (FIG. 2). It will be understood that while several components, including the suction conduit 125, are illustrated herein as being collectively formed by the hose frame 124, these components can also be separately formed and provided within the housing 84.

Turning now to the operation of the system 10, the system 10 shown in FIGS. 1-10 can be used to effectively bathe a pet by applying liquid to the pet, agitating, and removing debris (which may include dirt, dust, soil, hair, and other debris) and liquid from the pet in accordance with the following method. Referring to FIG. 10 in particular, to perform pet bathing, the wand 96 coupled with the surface cleaning apparatus 14 is inserted into the wand override unit 18. When the wand 96 from a surface cleaning apparatus 14 is fully inserted into the wand override unit 18, the wand trigger 127 is fully depressed. As such the wand 96 is overridden as the wand 96 no longer controls the dispensing of cleaning fluid and is semi-permanently actuated to allow a constant flow of fluid from the surface cleaning apparatus 14 to the wand override unit 18 and the hand tool 12. The fluid can flow from the wand 96 through a second fluid delivery pathway extending through the housing 84 between the first coupler or wand coupler and the second coupler, including through the inlet conduit 122 and through the venturi assembly 120, such that the first coupler fluidly couples the second fluid delivery pathway with the clean solution tank assembly 206. Fluid can continue to flow from the venturi assembly 120 through the fluid delivery conduit 21, until it reaches the check valve body inlet 53.

When the surface cleaning apparatus 14 is operated, fluid from the clean solution tank assembly 206 of the surface cleaning apparatus 14 flows through the fluid delivery conduit of the hose 16 and into the wand 96. Fluid then flows through the fluid delivery nozzle 126 of the wand 96, the inlet conduit 122, the venturi assembly 120, and into the fluid delivery conduit 21, until it reaches the check valve body inlet 53 within the hand tool 12. If the trigger 48 of the hand tool 12 is not depressed, fluid does not flow through the check valve body 52. When the trigger 48 of the hand tool 12 is depressed, the fluid can then flow through the check valve body 52, through the check valve body outlet 55, and to the manifold inlet 63 via a conduit. Fluid then flows through the spray nozzle manifold assembly 62, into the spray nozzles 76, and can then flow through the fluid outlets 85 to be applied to the skin of a pet.

Simultaneously with the flow of fluid from the surface cleaning apparatus 14, when the surface cleaning apparatus 14 is operated, the suction source 214 applies suction to the suction/recovery pathway of the system 10. The suction provided by the suction source 214 allows used cleaning or rinsing fluid to be sucked up into the suction nozzle 57 of the hand tool 12. The used cleaning or rinsing fluid then flows through the nozzle outlet 61 into suction pathway 59 along the flow path 83, passing through the hose coupler 42 and into the suction conduit 23. Used cleaning or rinsing fluid within the suction conduit 23 is further sucked through the hose connector 90 and into the suction conduit 125 of the wand override unit 18. Used cleaning or rinsing fluid further enters the wand interior 95 and is sucked through the suction hose of the hose 16 until it reaches the recovery tank assembly 204 of the surface cleaning apparatus 14.

In one exemplary bathing operation, the user can first set the wand override unit 18 to a wash mode using the mode selector 94. To dispense fluid for washing the pet, the user depresses the trigger 48 on the hand tool 12. As fluid from the surface cleaning apparatus 14 flows through the venturi assembly 120, cleaning solution from the reservoir 92 can be added to the fluid from the surface cleaning apparatus 14. Cleaning solution from the reservoir 92 enters the reservoir tube 152 via the solution inlet 154 to reach the inlet 150 of the solution mixing check valve 142. When the mode selector 94 is set to the wash mode, the solution mixing check valve 142 is in an opened position, allowing cleaning solution to flow through to the outlet 148 of the solution mixing check valve 142, and into the solution inlet conduit 132 via the conduit 144. Cleaning solution then flows through the duckbill valve 134 and the lower inlet 130 of the venturi body, where it is mixed with the fluid from the surface cleaning apparatus 14. The mixed cleaning fluid and cleaning solution flows through the outlet 136 of the venturi assembly 120 and through the extension hose fluid delivery conduit 21 to reach the hand tool 12, which can be thought of as a first fluid delivery pathway extending from the cleaning solution reservoir 92 to the second coupler. The venturi assembly 120 couples the first fluid delivery pathway with the second fluid delivery pathway. Upon physical displacement of the trigger 48 by a user, the check valve plunger 50 is moved upwardly, allowing mixed solution to flow through the check valve body 52. The mixed solution will then flow into the spray nozzle manifold assembly 62 and flow out of the hand tool 12 via the fluid outlets 85 of the spray nozzles 76 to be applied to the skin of the pet being bathed by the user.

While the wand override unit 18 rests on a surface, for example, the floor, the user can hold the hand tool 12 in a hand and move the hand tool 12 along the coat of the pet in the direction of the arrow 80 as shown in FIG. 4. As the user moves the hand tool 12 in the direction of the arrow 80, the wedge-shaped spray nozzles 76 can act as furrows or plows to effectively penetrate and part the hair, fur, or coat of the animal being bathed so that the mixed cleaning solution can have optimal contact directly with the skin of the animal. This results in optimal cleaning performance, allowing the hand tool 12 to flush dead skin cells, dirt, bacteria, or other debris off the skin of the pet. The movement of the wedge-shaped spray nozzles 76 along the skin and through the coat of the pet also serves to agitate or massage the mixed cleaning solution onto the pet's skin and coat. The user can also choose to use only the main plate 68 or to use the main plate 68 along with the outer plate 70 depending on the characteristics of the coat to be bathed and the length of the spray nozzles 76 protruding that would be optimal for that pet's coat.

As the mixed cleaning solution and cleaning fluid is being applied to the pet's skin and coat, the hand tool 12 is also providing suction to remove the used mixed cleaning solution and soil from the pet's skin and coat. The suction is provided by the surface cleaning apparatus 14 via the suction hose contained within both the extension hose 20 and the hose 16. The suction is applied through the screen 58 of the hand tool 12 so that large debris and fur or hair will not be sucked into the hand tool 12. The spent mixed cleaning solution that is sucked through the screen 58 follows the flow path according to the arrow 83 as shown in FIG. 6. The spent mixed cleaning solution flows from the hand tool 12 through the extension hose 20, through the wand override unit 18 via the channel defined by the hose frame 124, into the hose 16, and into the surface cleaning apparatus 14.

Once the pet has been washed, the user can then set the wand override unit 18 to the rinse mode using the mode selector 94, during which cleaning fluid, typically water, is applied to the pet to rinse the mixed fluid and any remaining soil from the pet's skin and coat. The application of cleaning fluid during the rinse mode is substantially the same as already described for the application of mixed fluid during the wash mode, except that the solution mixing check valve 142 is in a closed position and cleaning solution is not added from the reservoir 92. As the cleaning fluid is being applied, the hand tool 12 is also providing suction to remove the used cleaning fluid and soil from the pet's skin and coat.

After the pet has been rinsed, the user can then release the trigger 48 on the hand tool 12 in order to just apply suction, without fluid, to the pet in order to remove additional liquid from the pet's coat and skin. As such, the pet will be left in a relatively dry condition in comparison to tradition baths or showers.

It is noted that the system 10 discussed herein may be configured to halt or temporarily interrupt suction during the application of wash fluid and/or rinse fluid. Also, it is noted that a user may initially wet the pet's coat by operating the system 10 in the rinse mode prior to switching to the wash mode.

To the extent not already described, the different features and structures of the various examples of the pet bathing system 10, may be used in combination with each other as desired, or may be used separately. That one pet bathing system 10 is illustrated herein as having all of these features does not mean that all of these features must be used in combination, but rather done so here for brevity of description. Furthermore, while the surface cleaning apparatus 14 shown herein is a portable surface cleaning apparatus 14, features of the portable surface cleaning apparatus 14 can alternatively be applied to upright-type, canister-type, or stick vacuum cleaners. Thus, the various features of the different examples may be mixed and matched in various vacuum cleaner configurations as desired to form new examples, whether or not the new examples are expressly described.

The examples described herein define an exemplary pet bathing system that can deliver superior pet bathing performance in a manner that is faster and uses less cleaning solution than a traditional bath. The grooming guard plates can also be used to customize the pet bathing system to the coat length or characteristics of the pet to be bathed by altering the exposed nozzle depth of the hand tool. The system can be sold in conjunction with a surface cleaning apparatus or can be sold as a kit assembly that can be used to adapt an already existing surface cleaning apparatus to be used as a pet bathing system. In addition, the extension hose permits the surface cleaning apparatus and suction source to be located remotely from the pet, which can reduce sound level to avoid startling or frightening the pet. Furthermore, by having a fluid supply tank located in the surface cleaning apparatus, as well as the reservoir located within the wand override unit, it is possible for a user to employ a two-part washing chemistry for pet bathing, wherein a first chemistry is added to the clean water in the surface cleaning apparatus and a second chemistry can be added to the wand override unit's reservoir for selective addition to the first chemistry.

While the present disclosure has been specifically described in connection with certain specific examples thereof, it is to be understood that this is by way of illustration and not of limitation. Reasonable variation and modification are possible with the scope of the foregoing disclosure and drawings without departing from the spirit of the invention which, is defined in the appended claims. Hence, specific dimensions and other physical characteristics relating to the examples disclosed herein are not to be considered as limiting, unless the claims expressly state otherwise.

What is claimed is:

1. A hand tool for grooming a pet and adapted to be fluidly coupled with a surface cleaning apparatus having a suction source and a fluid delivery system, the hand tool comprising:
    a body that is hand-holdable by a user and defines an interior and a lower surface;
    a suction nozzle provided with the body;
    at least one spray nozzle provided at least partially within the interior;
    a first grooming guard and a second grooming guard removably provided at the lower surface of the body;
    wherein the first grooming guard comprises a main plate and the second grooming guard comprises an outer plate, the outer plate being stackable on an exterior surface of the main plate;
    wherein the first grooming guard and the second grooming guard each include at least one respective aperture, and wherein the at least one spray nozzle projects through the at least one respective aperture of both the first grooming guard and the second grooming guard; and
    wherein the outer plate is adapted to be removed from the body to adjust an effective length of the at least one spray nozzle such that the effective length of the at least one spray nozzle is greater when the outer plate is separated from the body.

2. The hand tool of claim 1, wherein the first grooming guard has a different thickness than the second grooming guard.

3. The hand tool of claim 1, wherein the first grooming guard is coupled with the body through at least one of a fastener and snap-fit connection.

4. The hand tool of claim 1, wherein the first grooming guard includes a suction opening which aligns with the suction nozzle.

5. The hand tool of claim 1, comprising a screen positioned adjacent the suction nozzle.

6. The hand tool of claim 1, wherein the at least one spray nozzle projects at an angle relative to the lower surface.

7. The hand tool of claim 1, wherein the at least one spray nozzle comprises a wedge shape defining a leading edge.

8. The hand tool of claim 1, wherein the at least one spray nozzle terminates in a flat surface.

9. The hand tool of claim 1, wherein the at least one spray nozzle comprises at least one fluid outlet provided in at least one surface of the spray nozzle selected from a terminal flat surface of the spray nozzle and a vertical surface of the spray nozzle.

10. The hand tool of claim 1, wherein the at least one spray nozzle comprises a plurality of spray nozzles.

11. The hand tool of claim 1, comprising:
    a fluid dispensing pathway formed within a portion of the body and fluidly coupled with the at least one spray nozzle; and
    a check valve assembly coupled with the fluid dispensing pathway and selectively moveable between a closed position and an open position to allow fluid to flow to the at least one spray nozzle through the fluid dispensing pathway.

12. The hand tool of claim 11, wherein the check valve assembly is selectively moveable between the closed position and the open position through actuation of a trigger.

13. The hand tool of claim 1, comprising:
    a manifold chassis at least partially located within the body; and
    a spray nozzle manifold assembly coupled with the manifold chassis and having an upper manifold portion and a lower manifold portion, the at least one spray nozzle protruding from the lower manifold portion.

14. The hand tool of claim 13, wherein the main plate and the outer plate are each selectively removably couplable to the manifold chassis over the spray nozzle manifold assembly.

15. A system for bathing a pet, comprising:
    a surface cleaning apparatus having a suction source and a fluid delivery system;
    a hand tool adapted to be fluidly coupled with the surface cleaning apparatus, the hand tool comprising:
        a body that is hand-holdable by a user and defines an interior and a lower surface;
        a suction nozzle provided with the body, the suction nozzle in fluid communication with the suction source;
        at least one spray nozzle provided at least partially disposed within the interior; and
        a first grooming guard and a second grooming guard removably provided at the lower surface of the body;
        wherein the first grooming guard comprises a main plate and the second grooming guard comprises an outer plate, the outer plate being stackable on an exterior surface of the main plate;
        wherein the first grooming guard and the second grooming guard each include at least one respective aperture, and wherein the at least one spray nozzle projects through the at least one respective aperture of both the first grooming guard and the second grooming guard; and
        wherein the outer plate is adapted to be removed from the body to adjust an effective length of the at least one spray nozzle such that the effective length of the at least one spray nozzle is greater when the outer plate is separated from the body.

16. The system of claim 15, wherein the surface cleaning apparatus further comprises:
    a wand having a wand trigger, a suction inlet fluidly coupled with the suction source, and a fluid outlet fluidly coupled with the fluid delivery system; and
    a wand override tool comprising:
        a wand override tool housing;
        a cleaning solution reservoir carried by the wand override tool housing;
        a first coupler provided on the wand override tool housing and adapted to receive at least a portion of the wand;
        a second coupler provided on the wand override tool housing;
        a recovery pathway extending through the wand override tool housing between the first and second couplers and fluidly coupled to the suction inlet of the wand;
        a first fluid delivery pathway extending through the wand override tool housing between the first and second couplers and fluidly coupled to the fluid outlet of the wand; and a second fluid delivery pathway extending through the wand override tool housing between the first and second couplers.

17. The system of claim 16, wherein the hand tool is adapted to be coupled to the second coupler such that the suction nozzle is fluidly coupled with the recovery pathway, and the at least one spray nozzle is fluidly coupled with the second fluid delivery pathway.

18. A system for bathing a pet, comprising:
- a surface cleaning apparatus having a suction source and a fluid delivery system, the surface cleaning apparatus further comprising:
  - a wand having a wand trigger, a suction inlet fluidly coupled with the suction source, and a fluid outlet fluidly coupled with the fluid delivery system; and
  - a wand override tool comprising:
    - a wand override tool housing;
    - a cleaning solution reservoir carried by the wand override tool housing;
    - a first coupler provided on the wand override tool housing and adapted to receive at least a portion of the wand;
    - a second coupler provided on the wand override tool housing;
    - a recovery pathway extending through the wand override tool housing between the first and second couplers and fluidly coupled to the suction inlet of the wand;
    - a first fluid delivery pathway extending through the wand override tool housing between the first and second couplers and fluidly coupled to the fluid outlet of the wand; and
    - a second fluid delivery pathway extending through the wand override tool housing between the first and second couplers;
- a hand tool adapted to be fluidly coupled with the second coupler, the hand tool comprising:
  - a body that is hand-holdable by a user and defines an interior and a lower surface;
  - a suction nozzle provided with the body, the suction nozzle in fluid communication with the suction source;
  - at least one spray nozzle provided at least partially disposed within the interior; and
  - at least one grooming guard removably provided at the lower surface of the body, wherein the at least one grooming guard includes at least one aperture, and wherein the at least one spray nozzle projects through the at least one aperture.

* * * * *